March 31, 1953  H. L. SCHWARTZ  2,632,991
ADJUSTABLE DIVIDER FOR SICKLE BARS
Filed Sept. 29, 1949
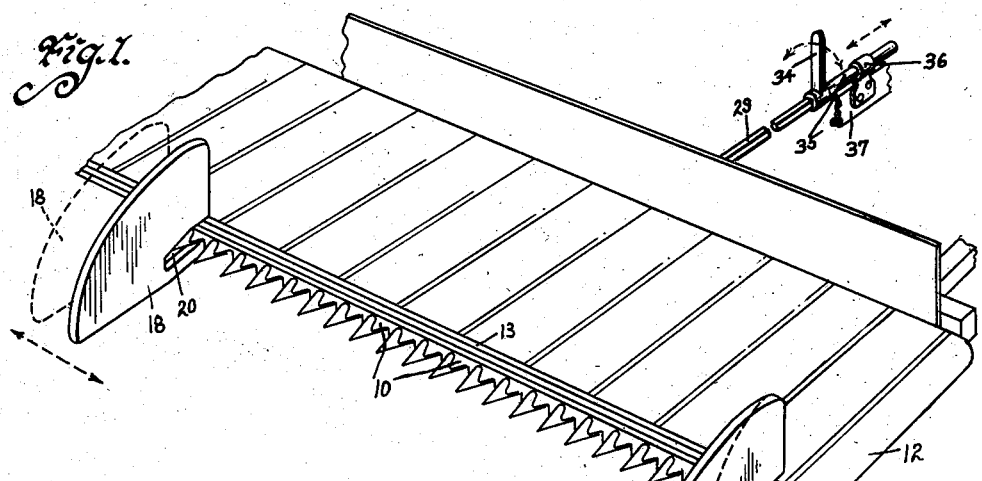
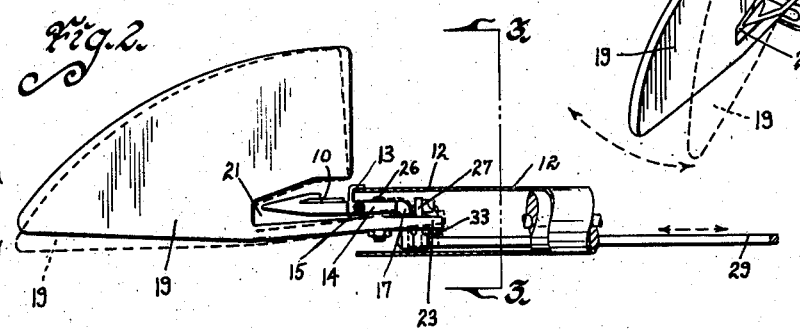
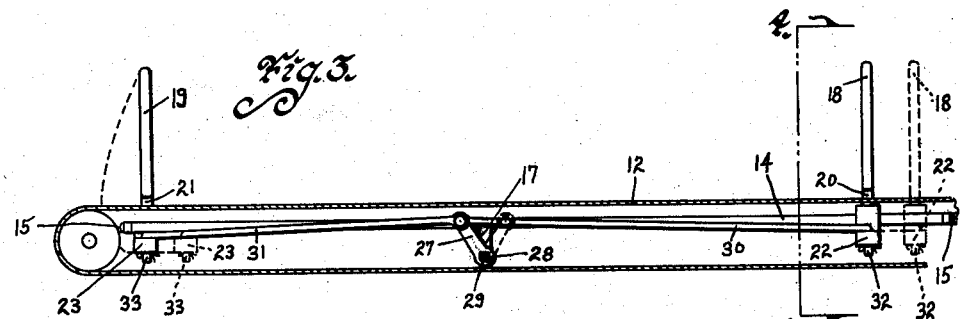
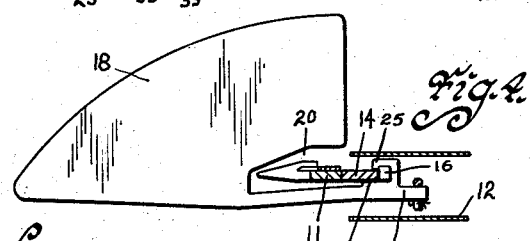
Inventor
Henry L. Schwartz
by M. Talbert Dick
Attorney
Witness
Edward P. Seeley Patented Mar. 31, 1953

2,632,991

UNITED STATES PATENT OFFICE 2,632,991

ADJUSTABLE DIVIDER FOR SICKLE BARS

Henry L. Schwartz, McAllen, Tex.

Application September 29, 1949, Serial No. 118,652

6 Claims. (Cl. 56—314)

My invention relates to a divider designed for use with a sickle bar or the like and more particularly to a divider that can be laterally and vertically adjusted by the operator of the machine to which the sickle bar is attached.

Dividers have long been used on sickle bars for guiding the grain or the like into the cutting teeth. These dividers are rigidly secured, one to each end of the cutting bar, and will cut a swath according to the path taken by the tractor or the like to which the sickle bar is attached. Sometimes, this swath is straight but frequently it is not; due to the unevenness of the ground or the fault of the tractor operator. Consequently, an uneven swath once made would set the course of the tractor for further cuttings and unless the edges of the swath are straightened, the sickle bar would thereafter travel a weaving course. To straighten the swath at times requires extra manipulation of the tractor and sickle bar which can consume much valuable time.

Therefore, it is an object of my invention to provide adjustable dividers for a sickle bar or the like that can be laterally or vertically adjusted as the sickle is cutting and thereby making it possible to cut a wider swath around the corner or adjust the edge of the swath when necessary, without any additional manipulation of the tractor and sickle bar.

It is a further object of my invention to provide adjustable dividers for use with a sickle bar or the like that can be easily and quickly controlled by a lever, rope or automatic control conveniently located within reach of the operator.

A still further object of this invention is to provide an adjustable divider for a sickle bar or the like that is economical in manufacture, simple in construction and efficient in use.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a perspective view of my dividers shown attached to a sickle bar with the dotted lines indicating the position to which each respective divider can be laterally moved, Fig. 2 is a side view of the divider shown at the right of Fig. 1 with the dotted lines indicating the vertical movement thereof, and with a cut away portion to more fully illustrate the manner in which the divider is attached to the sickle bar, Fig. 3 is a cross-sectional view of this device taken on the line 3—3 of Fig. 2, and Fig. 4 is a side view of one of these dividers taken on the line 4—4 of Fig. 3 and showing in cross-section that portion of the divider attached to the sickle bar.

Referring to the drawings I have used the numeral 10 to designate sickle teeth secured to a support bar 11. The numeral 12 designates an endless belt and the numeral 13 designates a protective cover for the front marginal edge of the belt 12, as shown in Fig. 1. Sickle bars or crops cutting devices of this type are in common use and it is to such a device that I attach my dividers.

The numeral 14 designates an elongated bar member arranged behind the support bar 11 and on the same plane thereof and hingably secured to the bar 11 at the respective ends thereof as indicated by the pivot points 15 in Fig. 2 and Fig. 3. An upwardly extending lip member 16 is provided longitudinally on the top of the back marginal edge of the support bar 14. A bearing arm 17 formed on the bar 14 extends downwardly from the center thereof, as shown in Fig. 3.

The numerals 18 and 19 designate the right and left dividers respectively which are shaped similarly to a boat rudder and are each provided with the slot portions 20 and 21 respectively near the bottom of the back edges thereof. The bottom portions of each of the dividers 18 and 19 project backwardly therefrom to form the respective tongue members 22 and 23.

The tongue 22 on the right divider 18 has a bearing surface 24 and a hook member 25. The hook 25 is designed to engage the front side of the lip 16 and to be laterally slidable thereon with the bearing surface 24 slidably engaging the bottom of the bar 14, as shown in Fig. 4. The divider 18 is normally positioned at the right end of the sickle bar.

The left divider 19 is pivotally secured to the left end of the bar 14 by the pin 26, as shown in Fig. 2.

The numeral 27 designates a link member having a square opening 28 in its bottom portion that is designed to fit the square control rod 29. The free tip end of the control rod shaft 29 is cylindrical in shape so it can be rotatably secured to the bottom of the bearing arm 17.

The numerals 30 and 31 designate two link rod members respectively that are each bent at right angles on one respective end to form the hook portions 32 and 33 and at the other respective ends thereof are pivotally secured to the top portion of the link member 27. The hook ends 32 and 33 on the link rods 30 and 31 respectively are detachably secured to the rear portions of the tongues 22 and 23 respectively, as shown in Fig. 3.

The control rod 29 extends from the bearing arm 17 to any position convenient to the operator. It is provided with a control lever handle 34 and designed so that the portion 35 which extends back of the lever 34 is cylindrical in shape. This portion 35 is rotatably and slidably positioned in a sleeve 36 and the sleeve is secured to any suitable support such as indicated by the numeral 37. The sleeve 36 serves not only as a support for the shaft portion 35 but the front of the sleeve acts as a stop means to limit the slidable motion of the shaft to the rear.

When this device is constructed and arranged as described, both of the dividers can be moved laterally or vertically by a single control rod or other control device as desired. In the explanation of the operation of this device and in the definition thereof in the claims to follow it is pointed out that the pivot or inner end of this sickle bar or crops cutting device is referred to as the stubbleward end, and the outer end thereof as the grainward end; more particularly, then, in the device illustrated, the divider 19 is on the stubbleward end, and divider 18 is on the grainward end.

In the operation of this invention, the lateral movement of the control rod 29 by use of the lever 34 will correspondingly move the link member 27. As this occurs the link rod 30 will move the tongue 22 that causes the right divider 18 to slide along the bar 14. At the same time the link rod 31 will move the tongue 23 on the left divider so as to pivot the divider on the pin 26. In this manner the right divider on the grainward end will move laterally and the left divider 19 on the stubbleward end will pivot laterally, as indicated in Fig. 1. The slots 20 and 21 permit this lateral movement of the dividers without interference from the sickle teeth. This control of the dividers is possible while the sickle bar is in operation and will enable the operator to gather in portions of grain or the like without changing the direction of travel of the sickle.

A vertical movement of the dividers is possible by moving the lever handle 34 forwardly or backwardly. A forward movement will bring pressure to bear on the bottom of the bearing arm 17. Since the arm 17 is secured to the bar 14 and the bar 14 is pivotally secured to the support bar 11, this forward pressure will lower the back of the bar 14, thus elevating the dividers. A rearwardly pull on the lever 34 will raise the back of the bar 14 and cause the dividers to dip downwardly.

Thus it will be seen that the divider 18 can be horizontally slid laterally either to the left or right and lowered or raised. The divider 19 can be horizontally pivotally swung laterally to the left or right and lowered or raised.

The construction of this device with the use of one laterally slidable divider and one laterally pivotable divider is more particularly designed to make possible a clean cut of grain or the like when turning a corner. When using a harvester, windrower or the like, the operator usually cuts a rectangular pattern and cutting a clean corner without additional maneuvering of the machine and without altering the width of the swath adjacent the corner poses a problem that does not appear to have been overcome by the prior art in such cutting machines. Harvesters, windrowers and the like usually have a platform of specific width and cutting teeth for cutting a swath of such width. For example, the windrower may be a six foot, eight foot, or of another specified size so that normally it is capable of cutting a swath of a specified width. Assuming such a machine to have an eight foot capacity, as a corner is turned, obviously the swaths at right angles to each other will be the same width, i. e. eight feet, but without an expanding adjustment of the distance between the dividers all the grain at the outer edge of the corner will not be cut but will leave a triangular area uncut. This results from the fact that the diagonal distance across a square corner of the swath is greater than the width of the swath itself. Consequently, a substantially square clean cut at the corner cannot be made without additional maneuvering and stopping of the machine.

It is possible, however, to cut the outer corner of the grain by moving the machine laterally outwardly at the corner but this would reduce the width of the swath near the corner and would soon produce a considerable lobe-like curve at each corner as the machine was maneuvered to cut the full swath after each turn. By my device, however, a substantially square corner can be cleanly cut without stopping and maneuvering the machine. This is done by increasing the width between the dividers to a point greater than the fixed width capacity of the cutter. It is the expanding adjustment of my device that I deem of importance and the dividers are not designed to reduce the width of the swath for which the particular windrower, harvester or the like may be designed. Obviously a swath of lesser width than the capacity of the machine can be cut merely by engaging only a portion of the cutting teeth with the uncut grain.

The device shown in the drawings is for a left hand turn and by reversing the position of the respective dividers it will of course operate for a right hand turn. This, is a mere matter of choice depending upon the construction and arrangement of the particular coupling means on the tractor to which it is attached.

In my device, as the corner is reached and the turn is started to the left, the movement of the lever handle to the right causes the left divider 19 to pivot on the pin 26 so that the forward tip end of this divider moves to the left to gather in the grain on the inside corner and at the same time the right divider 18 will move laterally to the right or in the opposite direction to the divider 19 to increase the width of the swath and consequently direct the grain at the outside corner of the turn into the cutting teeth. In this operation the position of the divider 19 does not change relative to its point of attachment to the bar 14 while the divider 18 moves to increase the distance between the dividers to a point greater than the predetermined width capacity of the machine. In their extended positions, the forward tips of the dividers will obviously be farther apart than their rearwardly tongue portions due to the pivoting action of the divider 19 and this combination of the two dividers makes it possible to produce a lighter weight and more efficient cutting device for the following reason. The additional swath width required for cutting a clean corner can be easily calculated for any windrower or the like having a fixed width capacity. Such extra width could obviously be provided by extending the teeth outwardly on the outside cutting end and providing a single divider that would be laterally slidable. This would entail considerable extra costs, weight and unnecessary structure and thus by using the two dividers as described I am able to provide the additional cutting capacity required at corners by dividing the extra distance between two dividers. This eliminates any need for a burdensome machine. It is also pointed out that my device is designed to operate at the front of a tractor where the operator can easily see the movement of the cutters and dividers.

Some changes may be made in the construction and arrangement of my adjustable dividers for a sickle bar without departing from the real spirit and purpose of my invention, and it is my intention to cover by my claims, any modified forms of structure or use of mechanical equivalents which may be reasonably included within their scope.

I claim:

1. In a harvester having a horizontally disposed elongated crops cutting device having a stubbleward end and a grainward end, a first crops divider, vertical pivot means on said grainward end of said cutting device having said divider mounted thereon, said divider extending forwardly from said cutting device and pivotally movable from said forwardly extending portion to a position in which said divider extends at an acute angle grainwardly, a second forwardly extending divider slidably mounted on said cutting device at a point intermediate the ends thereof and slidably from said point to the stubbleward end of said cutting device, operating means operatively connected to said second divider and to said first divider to simultaneously move said first divider grainwardly about its point and said second divider bodily stubblewardly.

2. In a harvester having a horizontally disposed elongated crops cutting device having a stubbleward end and a grainward end, a first crops divider, vertical pivot means on said grainward end of said cutting device having said divider mounted thereon, said divider extending forwardly from said cutting device and pivotally movable from said forwardly extending portion to a position in which said divider extends at an acute angle grainwardly, a second forwardly extending divider slidably mounted on said cutting device at a point intermediate the ends thereof and slidably from said point to the stubbleward end of said cutting device, operating means operatively connected to said second divider and to said first divider to simultaneously move said first divider stubblewardly about its point and said second divider bodily grainwardly.

3. In a harvester having a horizontally disposed elongated crops cutting device having a stubbleward end and a grainward end, a first crops divider, vertical pivot means on said grainward end of said cutting device having said divider mounted thereon, said divider extending forwardly from said cutting device and pivotally movable from said forwardly extending portion to a position in which said divider extends at an acute angle grainwardly, a second forwardly extending divider slidably mounted on said cutting device at a point intermediate the ends thereof and slidably from said point to the stubbleward end of said cutting device, operating means operatively connected to said second divider and to said first divider to simultaneously move said first divider grainwardly about its point and said second divider bodily stubblewardly, and said operating means also capable of simultaneously moving said dividers vertically at times.

4. In a harvester having a horizontally disposed elongated crops cutting device having a stubbleward end and a grainward end, a first crops divider, vertical pivot means on said grainward end of said cutting device having said divider mounted thereon, said divider extending forwardly from said cutting device and pivotally movable from said forwardly extending portion to a position in which said divider extends at an acute angle grainwardly, a second forwardly extending divider slidably mounted on said cutting device at a point intermediate the ends thereof and slidably from said point to the stubbleward end of said cutting device, operating means operatively connected to said second divider and to said first divider to simultaneously move said first divider stubblewardly about its point and said second divider bodily grainwardly, and said operating means also capable of simultaneously moving said dividers vertically at times.

5. In a harvester having a horizontally disposed elongated crops cutting device having a stubbleward end and a grainward end, a first crops divider, vertical pivot means on said grainward end of said cutting device having said divider mounted thereon, said divider extending forwardly from said cutting device and pivotally movable from said forwardly extending portion to a position in which said divider extends at an acute angle grainwardly, a second forwardly extending divider slidably mounted on said cutting device at a point intermediate the ends thereof and slidably from said point to the stubbleward end of said cutting device, operating means operatively connected to said second divider and to said first divider to simultaneously move said first divider grainwardly about its point and said second divider bodily stubblewardly, and said operating means also capable of simultaneously moving said dividers vertically at times with the respective vertical movements of said divider being in the same direction at the same time.

6. In a harvester having a horizontally disposed elongated crops cutting device having a stubbleward end and a grainward end, a first crops divider, vertical pivot means on said grainward end of said cutting device having said divider mounted thereon, said divider extending forwardly from said cutting device and pivotally movable from said forwardly extending portion to a position in which said divider extends at an acute angle grainwardly, a second forwardly extending divider slidably mounted on said cutting device at a point intermediate the ends thereof and slidably from said point to the stubbleward end of said cutting device, operating means operatively connected to said second divider and to said first divider to simultaneously move said first divider stubblewardly about its point and said second divider bodily grainwardly, and said operating means also capable of simultaneously moving said dividers vertically at times with the respective vertical movements of said divider being in the same direction at the same time.

HENRY L. SCHWARTZ.

REFERENCES CITED

The following references are of record in the file of this patent:

UNITED STATES PATENTS

| Number | Name | Date |
|---|---|---|
| 38,970 | Manny | June 23, 1863 |
| 78,709 | Yost | June 9, 1868 |
| 282,947 | Barnhard et al. | Aug. 14, 1883 |
| 298,054 | Barnhard | May 6, 1884 |
| 365,771 | Bachman | July 5, 1887 |
| 446,316 | Anthony | Feb. 10, 1891 |
| 1,859,208 | Kane | May 17, 1932 |